US005458256A

United States Patent [19]
Opheim

[11] Patent Number: 5,458,256
[45] Date of Patent: Oct. 17, 1995

[54] SLIDE LID

[75] Inventor: Dale C. Opheim, Graetting, Iowa

[73] Assignee: May-Wes Manufacturing, Inc., Gibbon, Minn.

[21] Appl. No.: 229,554

[22] Filed: Apr. 19, 1994

[51] Int. Cl.⁶ .................................................. B65D 43/12
[52] U.S. Cl. ........................................... 220/345; 220/351
[58] Field of Search ................................. 220/345, 346, 220/351, 347

[56] References Cited

U.S. PATENT DOCUMENTS

| D. 239,307 | 3/1976 | Sawyer . | |
|---|---|---|---|
| D. 334,728 | 4/1993 | Ishiyama et al. . | |
| 2,378,003 | 6/1945 | Duell | 217/62 X |
| 2,722,778 | 11/1955 | Carufel . | |
| 3,082,575 | 3/1963 | Schulz . | |
| 3,979,016 | 9/1976 | Frater . | |
| 4,469,241 | 9/1984 | Westphal | 220/346 |
| 4,502,610 | 3/1985 | Todd | 220/346 |

FOREIGN PATENT DOCUMENTS

| 449338 | 6/1936 | United Kingdom . |
|---|---|---|
| 1502258 | 3/1978 | United Kingdom . |

*Primary Examiner*—Allan N. Shoap
*Assistant Examiner*—Robin Hylton
*Attorney, Agent, or Firm*—Burd Bartz & Gutenkauf

[57] ABSTRACT

A slide lid for a seed box of a row crop planter has a top wall joined to downwardly directed side and end flanges which cooperate with outwardly directed lips on the box to retain the slide lid on the box and allow the slide lid to be moved generally horizontally to open and closed positions.

17 Claims, 4 Drawing Sheets

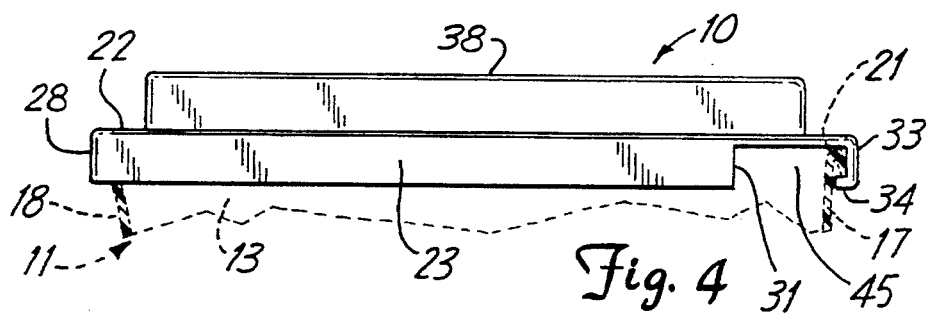
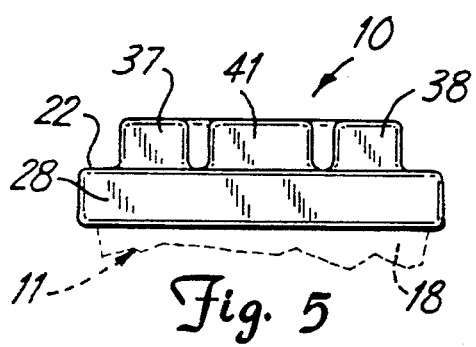
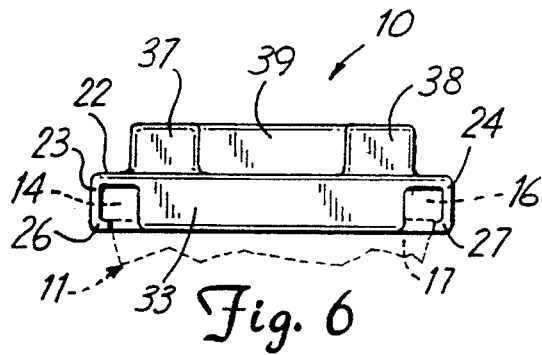
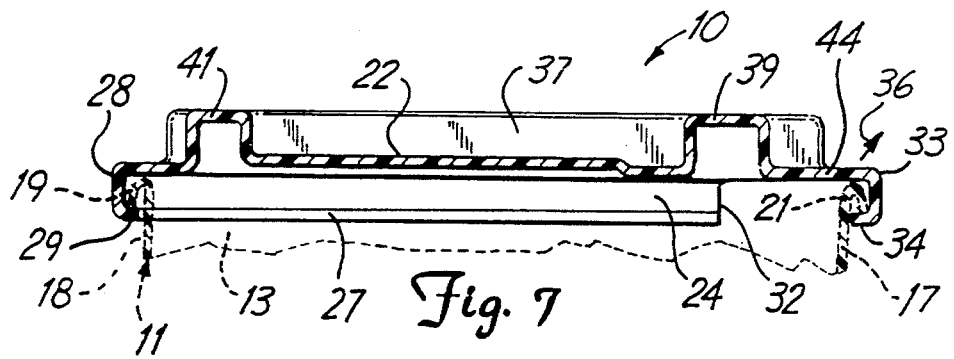

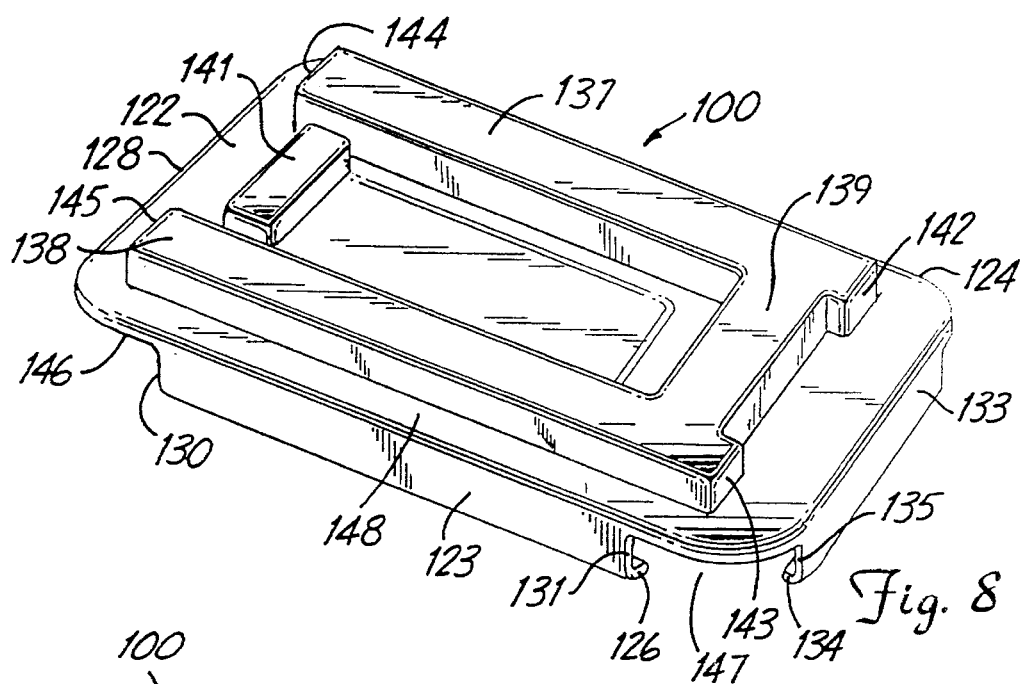
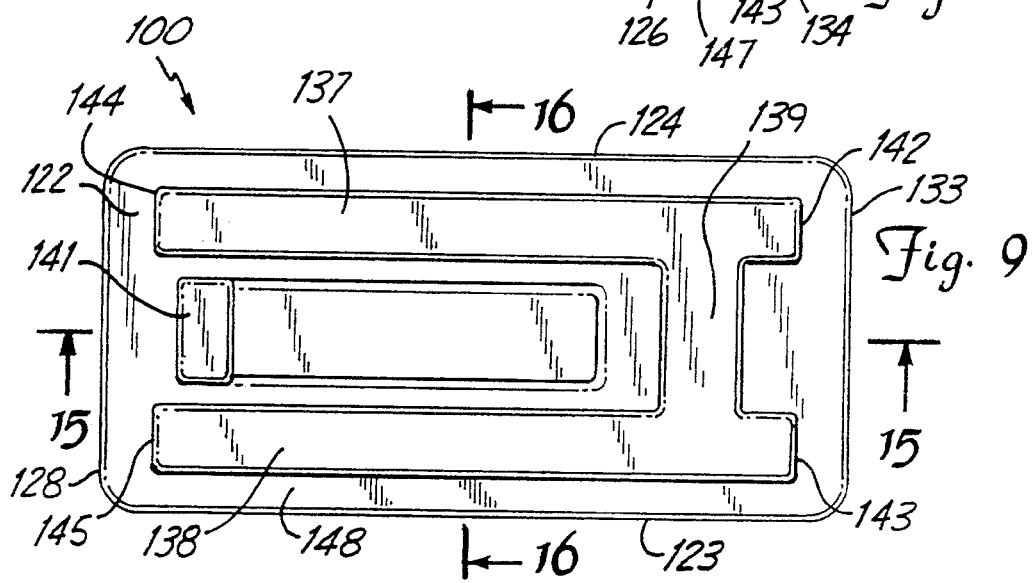
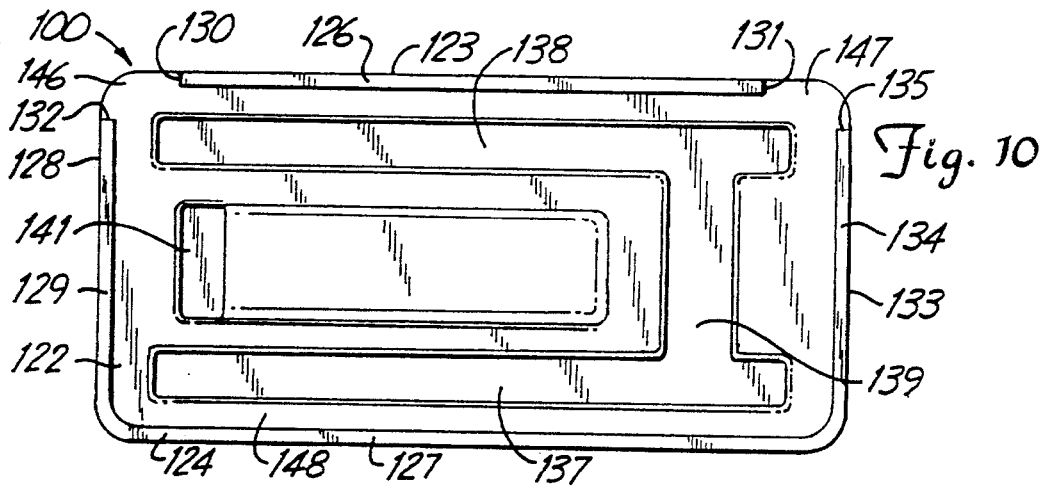

SLIDE LID

FIELD OF INVENTION

The invention is in the field of covers and doors for boxes and containers for accommodating products. The invention is directed to slide lids for row crop planter boxes which are longitudinally movable between open and closed positions to provide access to the boxes and to prevent the seeds from falling and blown by wind out of the boxes.

BACKGROUND OF INVENTION

Conventional row crop planting implements have a plurality of boxes or hoppers for accommodating seeds, insecticides and herbicides that are deposited into the ground in laterally spaced rows. The boxes are provided with covers to enclose the seeds, insecticides and herbicides within their respective boxes. The conventional covers have a tendency to be dislodged and blow off by wind of the top of the boxes. Also, the boxes must be emptied when used with a vertical-fold row crop planter when the planter is in the folded transport position. The slide lids of the invention are securely mounted on the box which prevents them from blowing off by wind. The slide lids also eliminate the need for emptying the boxes when folding a vertical-fold planter.

SUMMARY OF INVENTION

The invention is directed to a lid for a box for accommodating a product, such as seeds. The box is one of a plurality of boxes that are used with a row crop planter for accommodating seeds to be sequentially incorporated into the ground. The box has upright side walls and end walls that surround the chamber for accommodating the product. The upper edges of the side walls and end walls are joined to outwardly projected side and end lips which surround a top opening into the chamber of the box. The lid is a one-piece structure having a top wall that is movable to a first position for closing the top opening of the box and to a second position to allow access into the top opening of the box. Longitudinal side flanges joined to the side walls extend downwardly adjacent the outside of the side lips of the box. The flanges have inwardly directed portions or ledge extended under the side lips to retain the wall means on the box and allow linear movement of the wall means between the first and second positions thereof. Transverse flanges are joined to the end walls. These flanges extend downwardly adjacent the outside of the end lips of the box and have inwardly directed portions or ledges extended under the end lips to retain the wall means in the first position closing the top opening of the box. One of the transverse or longitudinal flanges is releasable from its adjacent lip to allow the wall means to be linearly moved from the first position to the second position thereby opening the top of the box. In one form of the slide lid, the longitudinal flanges each have an end spaced from one transverse flange whereby the one transverse flange can be released from the end lip holding the transverse flange, thereby allowing the wall to be moved longitudinally from the first position to the second position opening the box. In another form of the slide lid, the transverse flanges each have an end spaced from one longitudinal flange whereby the one longitudinal flange can be released from the slide lid associated with this flange thereby allowing the top wall to be moved transversely from the first position to the second position opening the box.

The top wall includes a pair of longitudinally upwardly extended ribs and a pair of transverse upwardly extended ribs. The pair of transverse ribs comprises a first rib extended between the longitudinal ribs and connected to the longitudinal ribs. The second transverse rib is extended between the longitudinal ribs and is spaced therefrom. The pairs of longitudinal ribs have ends spaced inwardly from the transverse flanges. One end of each longitudinal flange is in general alignment with the end of the longitudinal flanges whereby the top wall can be flexed to release the transverse flange from its associated lip. This is achieved by flexing the transverse flange in an outward direction. The end section of the top wall is flexed upwardly to release the ledge on the transverse flange from the outwardly directed end lip.

The lid is slideably associated with the top of the boxes on conventional row crop planters. The side flanges of the lid are located in sliding retaining relationship with the longitudinal lips. The transverse or longitudinal flanges are releasably latched onto the transverse lips when the lid is in the closed position. One of the transverse or longitudinal flanges is released from its associated lip to allow the lateral or sliding movement of the lid to the open position. When the lid is moved to the closed position, the transverse or longitudinal flanges will automatically snap on to the adjacent lips and thereby firmly retain the lid on the box. This prevents the lids from being dislodged and blowing off of the boxes in operating field conditions and eliminates the need for emptying the boxes when folding a vertical-fold planter.

DESCRIPTION OF DRAWINGS

FIG. 4 is a side elevational view of the slide lid;

FIG. 5 is an end elevational view of the left end of the slide lid;

FIG. 6 is an elevational view of the right end of the slide lid;

FIG. 7 is a sectional view taken along the line 7—7 of FIG. 2;

FIG. 8 is a perspective view of a modification of the slide lid;

FIG. 9 is a top plan view of the slide lid of FIG. 8;

FIG. 10 is a bottom plan view of the slide lid of FIG. 8;

DESCRIPTION OF THE PREFERRED EMBODIMENT

Figure 1:
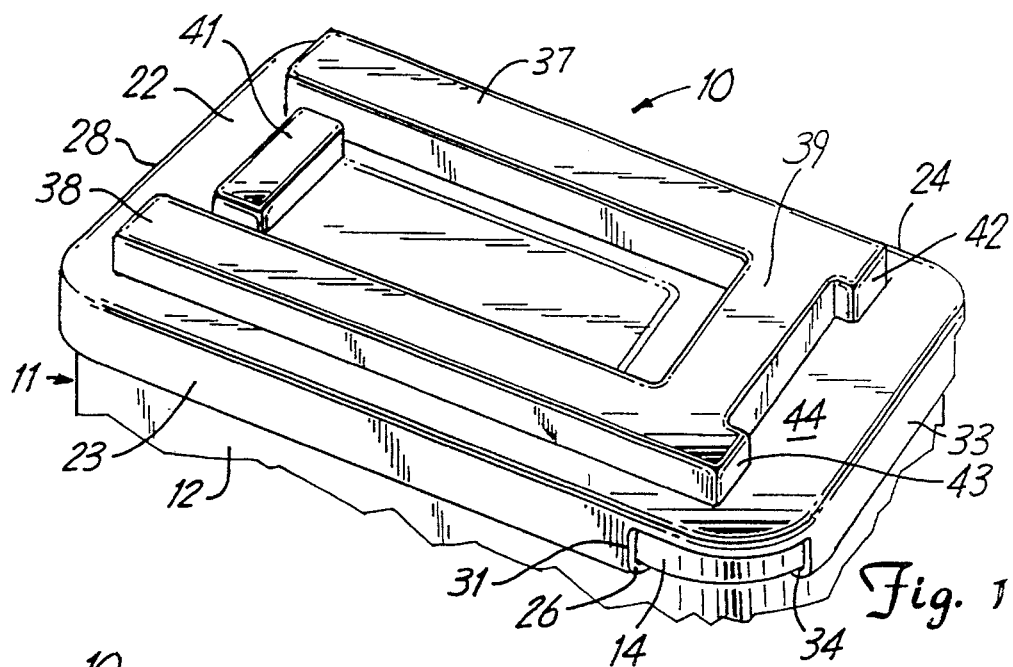
FIG. 1 is a perspective view of a slide lid closing a planter seed box.
Figure 2:
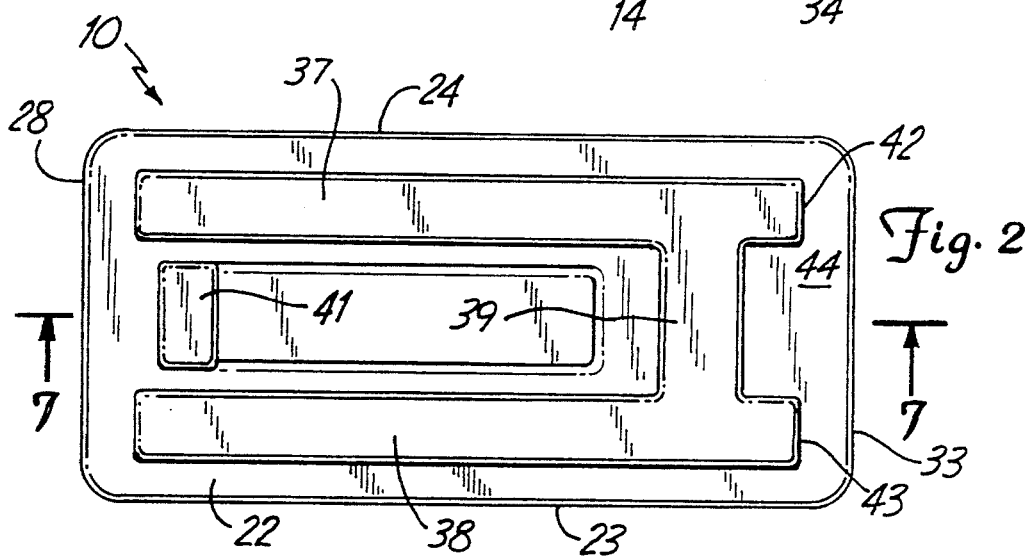
FIG. 2 is a top plan view of the slide lid.

Referring to FIGS. 1–7, there is shown a slide lid of the invention indicated generally at 10, associated with a seed box of an agricultural seed planter. Slide lid 10 can be used with other boxes or hoppers of the planter, such as the insecticide and herbicide boxes that accommodate granular materials that are deposited in the ground adjacent the seeds. Box 11 is conventional structure comprising an open top container or hopper for holding the seeds, such as corn, beans, cotton and like seeds adjacent a seeding mechanism (not shown) of a row crop planter. Box 11 has generally upright laterally spaced side walls 12 and 13. Side walls 12 and 13 have longitudinal outwardly directed top lips 14 and 16. End walls 17 and 18 are joined to opposite ends of side walls 12 and 13 to complete the wall structure of the box. The end walls 17 and 18 have transverse lips 19 and 21 that are joined to opposite ends of the longitudinal lips 14 and 16. As seen in FIGS. 4 and 7, the lips 14, 16, 19 and 21 are reverse turned upper edges of the walls 12, 13, 17 and 18 and have a generally U-shaped cross sectional structure. Box 11 is an example of one type of box that can accommodate the slide lid 10 of the invention. Box 11 is a one-piece structure made out of rigid plastic, such as polyethylene. Other types of materials can be used in the construction of the box.

In use, box 11, along with additional boxes on the planter must be periodically filled with seeds for other material to be dispensed into the ground. The lids associated with each box must be opened to permit placement of the seeds in the box and closed to confine the seeds to the box and protect the seeds from the environment, and dust, dirt and birds.

Slide lid 10 is a one-piece plastic structure slideably mounted on the longitudinal lips 14 and 16 for lateral movement between a first open position and a second closed position relative to the open top of the box. Lid 10 has a generally rectangular top wall 22 having a size and shape to cover the top opening of the box 11. Wall 22 has opposite longitudinal sides that are joined to a pair of downwardly directed side walls or flanges 23 and 24. Flanges 23 and 24 have inwardly directed portions or ledges 26 and 27 that extend under the associated longitudinal lips 14 and 16, respectively. Beads 26 and 27 retain lid 10 on box 11 and allow lid 10 to laterally move between open and closed positions. Longitudinal lips 14 and 16 serve as tracks or rails which guide lid 10 during its lateral movements between open and closed positions.

Figure 3:
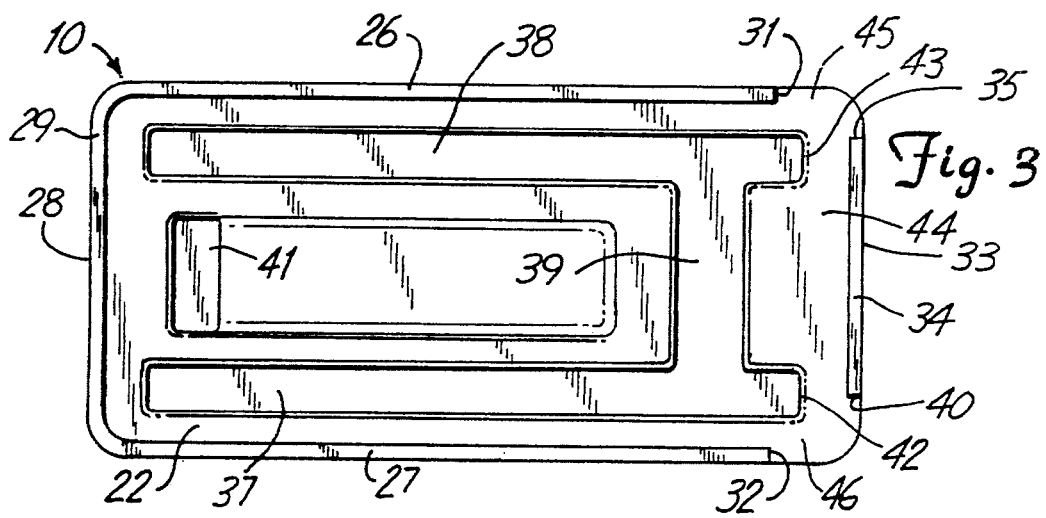
FIG. 3 is a bottom plan view of the slide lid.
Figure 11:
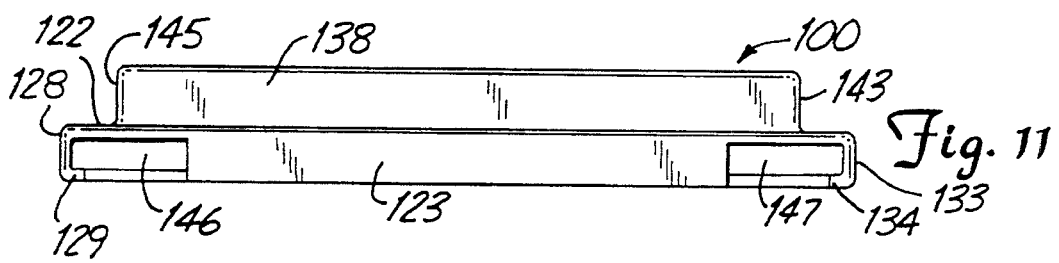
FIG. 11 is a side elevational view of the front side of the slide lid of Figure.
Figure 12:
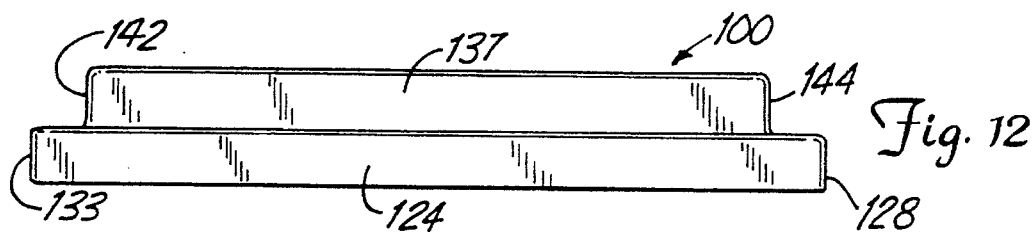
FIG. 12 is a side elevational view of the back side of the slide lid of FIG. 8.
Figure 13:
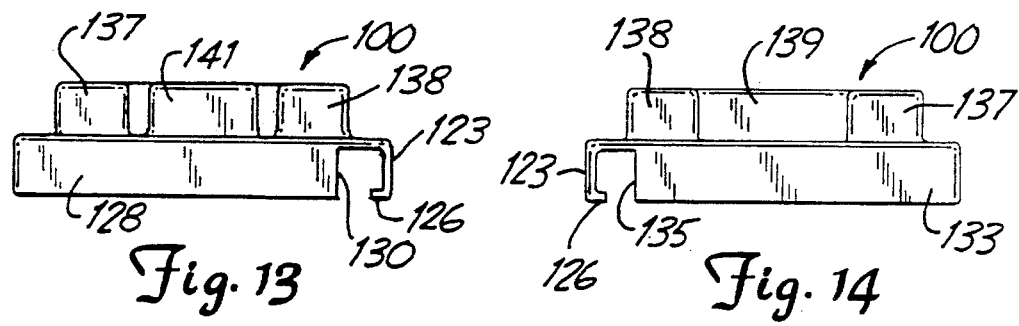
FIG. 13 is an end elevational view of the left end of FIG. 8.
Figure 14:
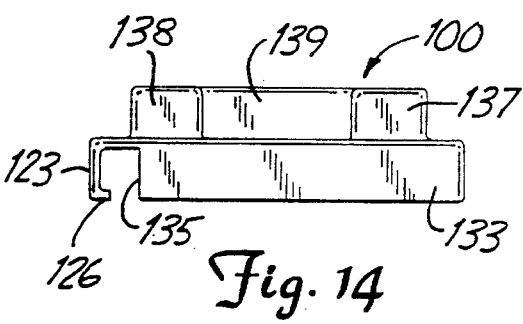
FIG. 14 is an end elevational view of the right end of FIG. 8.
Figure 15:
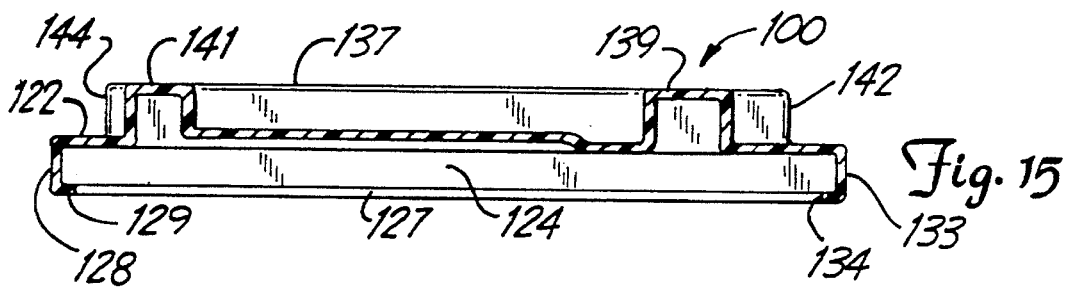
FIG. 15 is a sectional view taken along the line 15—15 of FIG. 9.
Figure 16:
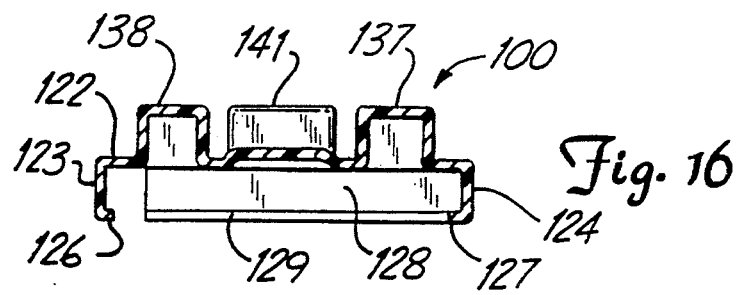
FIG. 16 is a sectional view taken along the line 16—16 of FIG. 9.

As seen in FIG. 7, bead 27 is a continuous longitudinal portion of the bottom of side flange 24. Ledge 27 extends inwardly and hooks under lip 16. Bead 26 also has a longitudinal linear shape and hooks under lip 14. Side flanges 23 and 24 are joined to a first transverse flange 28 having a continuous inwardly directed portion or Ledge 29 that is joined to the adjacent ends of ledges 26 and 27. As seen in FIG. 7, ledge 29 projects inwardly under the transverse lip 19 when the lid 10 is in the closed position. Longitudinal side flanges 26 and 27 have ends 31 and 32 spaced inwardly from a second transverse flange or latch 33. Flange 33 has an inwardly directed linear transverse portion or bead 34 that snaps over the transverse lip 21 to lock lid 10 in the closed position, as seen in FIG. 4. Flange 33 has opposite ends 35 and 40 spaced inwardly from the ends 31 and 32 of flanges 23 and 24. As seen in FIG. 3, the corners between ends 31–35 and 32–40 are open. This allows transverse wall section 44 to flex so that flange 33 can be released from its associated lip. Flange 33 is flexed or moved in an upward, outward direction, as indicated by the arrow 36 in FIG. 7, to release bead 34 from under the lip 21. This permits lid 10 to be moved laterally to the open position.

Top wall 22 has a pair of longitudinal side ribs 37 and 38 joined to a first transverse rib 39 at one end thereof. A second transverse rib 41 is located between the opposite ends of the longitudinal ribs 37 and 38. Opposite ends of ribs 41 are spaced from the adjacent inside walls of ribs 37 and 38. Ribs 37, 38, 39 and 41 have inverted U-shaped cross sections with generally flat top or upper walls. Ribs 37 and 38 are spaced inwardly from the side flanges 23 and 24, and have ends 42 and 43 spaced inwardly from the end flange 33. The portion 44 of the top wall is a generally flat structure which can flex or bend so that the end flange 33 can be released from the lip 22.

A modification of the slide lid of the invention indicated generally at 100, is shown in FIGS. 8–16. Slide lid 100 is adapted to fit on top of seed box 11 and is movable in a transverse horizontal direction between open and closed positions. Slide lid 100 can be used in other types of boxes having outwardly directed lips that cooperate with the slide lid to movably retain the slide lid on the seed box.

Slide lid 100 has a generally rectangular top wall 122 having opposite downwardly directed side flanges 123 and 124. Side flange 123 has a longitudinal inwardly directed portion or bead 126 terminating opposite ends 130 and 131. Side flange 124 has a longitudinal inwardly directed portion or ledge 127. Side flanges 123 and 124 are joined to end flanges 128 and 133 secured to opposite transverse ends of top 122. Flange 128 has an inwardly directed transverse portion or ledge 129 which terminates in an end 132 spaced, shown as space 146, from the end 130 of flange 123. Transverse flange 133 has an inwardly directed portion or ledge 134 terminating in an end 135. End 135 is spaced from the end 131 at corner space 147, as seen in FIGS. 8 and 10. The transverse members 128 and 133, along with their respective ledge 129 and 134, are transverse slide channels which accommodate the transverse lips of the box to allow transverse movement of the slide lid 100 between its open and closed positions and retain the slide lid on the box. When slide lid 100 is in the closed position, a longitudinal lip of the box is located under the ledge 127 of the flange 124. Flange 123, along with ledge 126, is a latch member that is associated with the opposite longitudinal lip of the box to releasably retain the slide lid in the closed position.

As seen in FIGS. 8, 9 and 10, slide lid 100 has a pair of longitudinal upwardly directed ribs 137 and 138. One end of each rib is attached to a transverse rib 139. A transverse rib 141 is located between and spaced from the opposite ends of the longitudinal ribs 137 and 138. Ribs 137, 138, 139 and 141 are U-shaped in cross section, which provides for longitudinal and transverse stability of top wall 122. Longitudinal rib 139 has opposite ends 142 and 144 spaced inwardly from the opposite ends of top wall 122. Longitudinal rib 138 has opposite ends 143 and 145 that are also spaced inwardly from the opposite ends of the top wall 122.

In use, spaces 146 and 147 adjacent opposite ends 130 and 131 of flange 123 allow the flange 123 to be placed in the open top of the box and the transverse lips of the box to be aligned with the channels adjacent the flanges 128 and 133. Slide lid 100 is then moved transversely across the open top of the box to close the box. The flange 123 is flexed over the lip of the box, as the top wall 122 has a longitudinal flex area 148. When the slide lid 100 is in the closed position, ledge 127 of flange 124 fits under a longitudinal lip of the box, thereby retaining slide lid 100 in the closed position. Flange 123 is flexed or bent outwardly and upwardly to release ledge 126 from its associated lip of the box. Slide lid 100 can then be moved transversely to open the top of the box.

Slide lid 100 is securely mounted on the seed box, as flanges 123, 124, 128 and 133, along with their associated inwardly directed ledges, engage all lips of the box. This prevents slide lid 100 from being dislodged and blown off of the seed box by wind and eliminates the needs for emptying the boxes when folding a vertical-fold planter.

While there has been shown and described preferred embodiments of the slide lid of the invention, it is understood that changes in the structures and materials may be made by those skilled in the art without departing from the invention. The slide lid can be used with boxes other than seed boxes associated with planters and agricultural equipment. The slide lid of the invention is defined in the following claims.

I claim:

1. A lid for a box having upright side walls and end walls, said end walls being joined to outwardly projected end lips, and said side walls being joined to outwardly directed side lips, said side walls and end walls surrounding a chamber for accommodating objects, and said lips surrounding a top opening into the chamber comprising: wall means movable to a first position for closing the top opening of the box and movable to a second position allowing access to the top opening of the box, longitudinal flanges joined to the wall means extending downwardly adjacent the outside of the side lips of the box, said flanges having inwardly directed portions extending under said side lips to retain the wall means on the box and allow linear movement of the wall means between the first and second positions thereof, and transverse flanges joined to the wall means extending downwardly adjacent the outside of the end lips of the box, said transverse flanges having inwardly directed portions extending under said end lips to retain the wall means in the first position closing the top opening of the box, the inwardly directed portions of the longitudinal flanges are continuous ledges extending inwardly toward the side walls of the box, said longitudinal flanges each having an end spaced inwardly from one of said transverse flanges, the inwardly directed portions of the transverse flanges are continuous ledges extending inwardly toward the end walls of the box, the one of said transverse flanges has opposite ends spaced inwardly from the adjacent ends of said longitudinal flanges, and said one transverse flange is adapted to be releasable from the adjacent end lip to allow said wall means to be moved from the first position to the second position thereby opening the top opening of the box.

2. The lid of claim 1 wherein: said wall means and said one transverse flange is movable away from the adjacent end wall of the box whereby said one transverse flange is releaseable from the end lip holding said one transverse flange.

3. The lid of claim 1 wherein: the wall means includes at least one upwardly extended rib.

4. The lid of claim 1 wherein: the wall means includes a pair of transverse upwardly extended ribs.

5. The lid of claim 1 wherein: said wall means includes a pair of longitudinal upwardly extended ribs, and a pair of transverse upwardly extended ribs.

6. A lid for a box having upright side walls and end walls, said end Walls being joined to outwardly projected end lips, and said side walls being joined to outwardly directed side lips, said side walls and end walls surrounding a chamber for accommodating objects, and said lips surrounding a top opening into the chamber comprising: wall means movable to a first position for closing the top opening of the box and movable to a second position allowing access to the top opening of the box, said wall means including a pair of longitudinal upwardly extended ribs and a pair of transverse upwardly extended ribs, said pair of transverse upwardly extended ribs comprises a first transverse rib extended between the longitudinal ribs and connected to the longitudinal ribs, and a second transverse rib extended between the longitudinal ribs and spaced therefrom, longitudinal flanges joined to the wall means extending downwardly adjacent the outside of the side lips of the box, said flanges having inwardly directed portions extending under said lips to retain the wall means on the box and allow linear movement of the wall means between the first and second positions thereof, and transverse flanges joined to the wall means extending downwardly adjacent the outside of the end lips of the box, said transverse flanges having inwardly directed portions extending under said end lips to retain the wall means in the first position closing the top opening of the box, and the one of said transverse flanges releasable from the adjacent end lip to allow said wall means to be moved from the first position to the second position thereby opening the top opening of the box.

7. The lid of claim 6 wherein: said longitudinal flanges each have an end spaced inwardly from one of said transverse flanges, and one of said transverse flanges has opposite ends spaced inwardly from the ends of said longitudinal flanges.

8. The lid of claim 6 wherein: each rib has an inverted U-shaped cross section.

9. A lid for a box having upright side walls and upright end walls each having top portions surrounding an opening into a chamber surrounded by the side walls and end walls, outwardly projected side lips joined to top portions of the side walls, and outwardly projected end lips joined to top portions of the end walls comprising: a one-piece structure movably mounted on the box between a first position closing the top of the box and a second position opening the top of the box, said structure having top wall means of a size to cover the opening into the chamber of the box for covering said opening, said top wall means having sides and ends, first and second flanges joined to the sides of the top wall means extending downwardly adjacent the side lips of the box, said first and second flanges having inwardly directed portions extending under the side lips and allow movement of the structure on the box, third and fourth flanges joined to the ends of the top wall means extending downwardly adjacent the end lips of the box, said third and fourth flanges having inwardly extended portions extending under the end lips, said inwardly directed portions of the flanges being operative to retain the structure on the box and allow the structure to be moved between its first and second positions, and one of said flanges having opposite ends spaced from adjacent flanges whereby said one of said flanges can be released from its associated lip to permit the structure to be moved from the first position to the second position.

10. The lid of claim 9 wherein: the first and second flanges each have an end spaced inwardly from said a flange.

11. The lid of claim 10 wherein: said one flange has opposite ends spaced inwardly from the ends of the first and second flanges.

12. The lid of claim 9 wherein: the third and fourth flanges each have an end spaced inwardly from said one flange.

13. The lid of claim 12 wherein: said one flange has opposite ends spaced inwardly from the ends of the third and fourth flanges.

14. The lid of claim 9 wherein: the inwardly directed portion on said one flange is a continuous ledge and the remaining inwardly directed portions of the flanges form a continuous ledge.

15. A lid for a box having upright side walls and upright end walls each having top portions surrounding an opening into a chamber surrounded by the side walls and end walls, outwardly protected side lips joined to top portions of the side walls, and outwardly protected end lips joined to top portions of the end walls comprising: a one-piece structure movably mounted on the box between a first position closing the top of the box and a second position opening the top of the box, said structure having top wall means of a size to cover the opening into the chamber of the box for covering said opening, said top wall means includes a pair of upwardly extended longitudinal ribs, and a pair of upwardly extended transverse ribs located between said longitudinal ribs, said top wall means having sides and ends, first and second flanges joined to the sides of the top wall means extending downwardly adjacent side lips of the box, said first and second flanges having inwardly directed portions extending under the end lips, said inwardly extended portions of the flanges being operative to retain the structure on the box and allow the structure to be moved between its first and second positions, and one of said flanges having opposite ends spaced from adjacent flanges whereby said one of said flanges can be released from its associated lip to permit the structure to be moved from the first position to the second position.

16. The lid of claim 15 wherein: said longitudinal ribs have opposite ends spaced inwardly from the third and fourth flanges.

17. A lid for a box having upright side walls and end walls, said end walls being joined to outwardly projected end lips, and said side walls being joined to outwardly directed side lips, said side walls and end walls surrounding a chamber for accommodating objects, and said lips surrounding a top opening into the chamber comprising: wall means for closing the open top of the box, said wall means being movable to a first position closing the top opening of the box and movable to a second position allowing access to the top opening of the box, longitudinal flanges joined to the wall means extending downwardly adjacent the outside of the side lips of the box, said flanges having inwardly directed portions extending under said side lips to retain the wall means on the box and allow linear movement of the wall means between the first and second positions thereof, and transverse flanges joined to the wall means extending downwardly adjacent the outside of the end lips of the box, said transverse flanges having inwardly directed portions extending under said end lips to retain the wall means in the first position closing the top opening of the box, and one of said longitudinal flanges having ends spaced from the transverse flanges whereby the inwardly directed portions of the one of said longitudinal flanges is releasable from its associated end lip to allow said wall means to be moved from the first position to the second position thereby opening the top opening of the box.

* * * * *